(12) United States Patent
Wang et al.

(10) Patent No.: US 10,175,778 B1
(45) Date of Patent: Jan. 8, 2019

(54) METHOD AND APPARATUS FOR REAL-TIME MOTION DIRECTION DETECTION VIA ACCELERATION-MAGNETIC FUSION

(71) Applicant: mCube, Inc., San Jose, CA (US)

(72) Inventors: James Wang, San Jose, CA (US); Chenglong Fu, San Jose, CA (US); Aga Hsu, San Jose, CA (US); Kevin Huang, San Jose, CA (US)

(73) Assignee: MCUBE, INC., San Jose, CA (US)

( * ) Notice: Subject to any disclaimer, the term of this patent is extended or adjusted under 35 U.S.C. 154(b) by 17 days.

(21) Appl. No.: 15/194,459

(22) Filed: Jun. 27, 2016

Related U.S. Application Data

(60) Provisional application No. 62/184,743, filed on Jun. 25, 2015.

(51) Int. Cl.
*G06F 3/03* (2006.01)
*G06F 3/0346* (2013.01)
*G01C 19/00* (2013.01)
*G01P 15/18* (2013.01)
*G01V 3/40* (2006.01)
*G09G 5/38* (2006.01)
*G09G 5/34* (2006.01)

(52) U.S. Cl.
CPC .......... *G06F 3/0346* (2013.01); *G01C 19/00* (2013.01); *G01P 15/18* (2013.01); *G01V 3/40* (2013.01); *G09G 5/34* (2013.01); *G09G 5/38* (2013.01); *G09G 2340/0464* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

2011/0307213 A1* 12/2011 Zhao .................. G01C 17/30
  702/153
2012/0221290 A1* 8/2012 Oka .................... G06F 15/00
  702/141

* cited by examiner

*Primary Examiner* — Joseph R Haley
(74) *Attorney, Agent, or Firm* — Richard T. Ogawa; Ogawa P.C.

(57) ABSTRACT

A method for a computing device includes determining in a magnetometer, magnetic data in response to a physical perturbation, determining in an accelerometer, acceleration data in response to the physical perturbation, determining with a processor, computed parameters in response to the magnetic data and the acceleration data, wherein the computed parameters includes a first and a second computed parameter, determining with the processor, an initial motion direction indicator in response to a weighted combination of the first computed parameter and the second computed parameter, determining with the processor, a motion direction indicator in response to the initial motion direction indicator, determining with the processor, a function to perform in response to the motion direction indicator, and displaying on a display of the portable computing device with the processor, a graphic image in response to the function.

16 Claims, 9 Drawing Sheets

METHOD AND APPARATUS FOR REAL-TIME MOTION DIRECTION DETECTION VIA ACCELERATION-MAGNETIC FUSION

CROSS-REFERENCE TO RELATED APPLICATIONS

The present invention is a non-provisional application of U.S. Application No. 62/184,743, filed Jun. 25, 2015. That application is incorporated by reference herein, for all purposes.

BACKGROUND

The present invention relates to motion detection. More specifically, the present invention relates to methods and apparatus for real-time motion direction detection.

The inventors of the present invention have utilized gyroscopes to help determine how a hand-held device is moved in space. Using physical gyroscopes, the inventors have determined that they provide accurate x, y and z rotation (panning direction) data, however the inventors have also determined that using physical gyroscopes have drawbacks. One drawback is that gyroscopes are relatively expensive to manufacture because of physics of such small scale devices. Another drawback is that they consume a relatively high amounts of power, which may be in the order of miliwatts. This high power consumption greatly limits use of physical gyroscopes in low power applications, such as in handheld devices, wearable devices, and the like.

The inventors have also experimented with virtual gyroscopes based upon accelerometer and magnetometer data to estimate motion data for the device. However the inventors have determined drawbacks with such virtual gyroscopes include that cross-axis artifacts are often returned as a result of the computations. As an example, a panning motion within an x-y plane, may be computed to, incorrectly, have some motion in the z-direction.

In light of the above, what is desired are improved methods and apparatus for real-time motion direction detection with reduced drawbacks.

SUMMARY

Embodiments of the present invention are directed towards a device with motion detection capability. More specifically, embodiments are directed to methods and apparatus providing Real time Motion Direction Identification (RMDI) or real-time Motion Direction Detection (RMDD).

In various embodiments, a device providing RMDI or RMDD may be a smart device such as a phone, tablet or other portable computing device. The device includes a magnetometer for determining a plurality of magnetic data in response to a physical perturbation of the portable computing device and an accelerometer for determining a plurality of acceleration data in response to the physical perturbation of the portable computing device, and a processor for computing the RMDI or RMDD. Based upon the computed data, the processor uses the direction data as input to an application running upon the device. The application may be a mapping application, an informational or advertisement-based application, or the like.

According to one aspect of the invention, a method for a portable computing device is disclosed. One technique includes determining in a magnetometer in the portable computing device, a plurality of magnetic data in response to a physical perturbation of the portable computing device, determining in an accelerometer in the portable computing device, a plurality of acceleration data in response to the physical perturbation of the portable computing device, and determining with a processor in the portable computing device, a plurality of computed parameters in response to the plurality of magnetic data and the plurality of acceleration data, wherein the plurality of computed parameters includes a first computed parameter and a second computed parameter. A process includes determining with the processor, an initial motion direction indicator in response to a weighted combination of the first computed parameter and the second computed parameter, determining with the processor, a motion direction indicator in response to the initial motion direction indicator, determining with the processor, a function to perform in response to the motion direction indicator; and displaying on a display of the portable computing device with the processor, a graphic image in response to the function.

According to another aspect of the invention, a portable computing device is disclosed. An apparatus includes a magnetometer for determining a plurality of magnetic data in response to a physical perturbation of the portable computing device, and an accelerometer for determining a plurality of acceleration data in response to the physical perturbation of the portable computing device. A system may include a processor for determining a plurality of computed parameters in response to the plurality of magnetic data and the plurality of acceleration data, wherein the plurality of computed parameters includes a first computed parameter and a second computed parameter, wherein the processor is for determining an initial motion direction indicator in response to a weighted combination of the first computed parameter and the second computed parameter, wherein the processor is for determining a motion direction indicator in response to the initial motion direction indicator, wherein the processor is for determining a function to perform in response to the motion direction indicator, and wherein the processor is for determining a graphic image in response to the function. A device may include a display coupled to the processor for displaying the graphic image.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
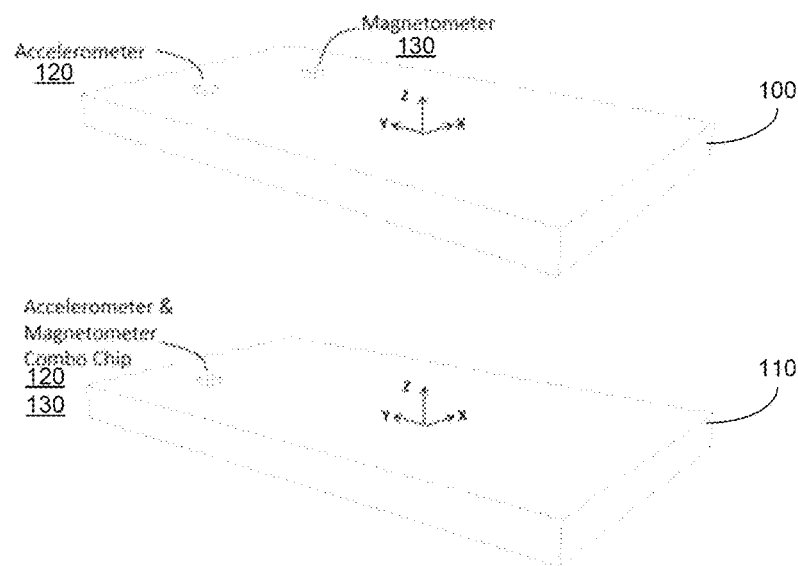
FIG. 1 illustrates embodiments of the present invention.

FIG. 1 illustrates embodiments of the present invention. More specifically, FIG. 1 illustrates example computing devices 100 and 110 for implementing a signal processing technique. In various embodiments, using accelerometer 120 and magnetometer 130 derived data (e.g. via data fusion), information regarding the moving direction of computing system 100 about the body-frame axes (e.g. x, y and z-axes) may be determined. In various embodiments, the real-time moving direction information may be used to activate other application process in the operation system of computing systems 100 and 110, such as mapping or navigation programs. Further description of computing systems is provided further, below.

Figure 2A:
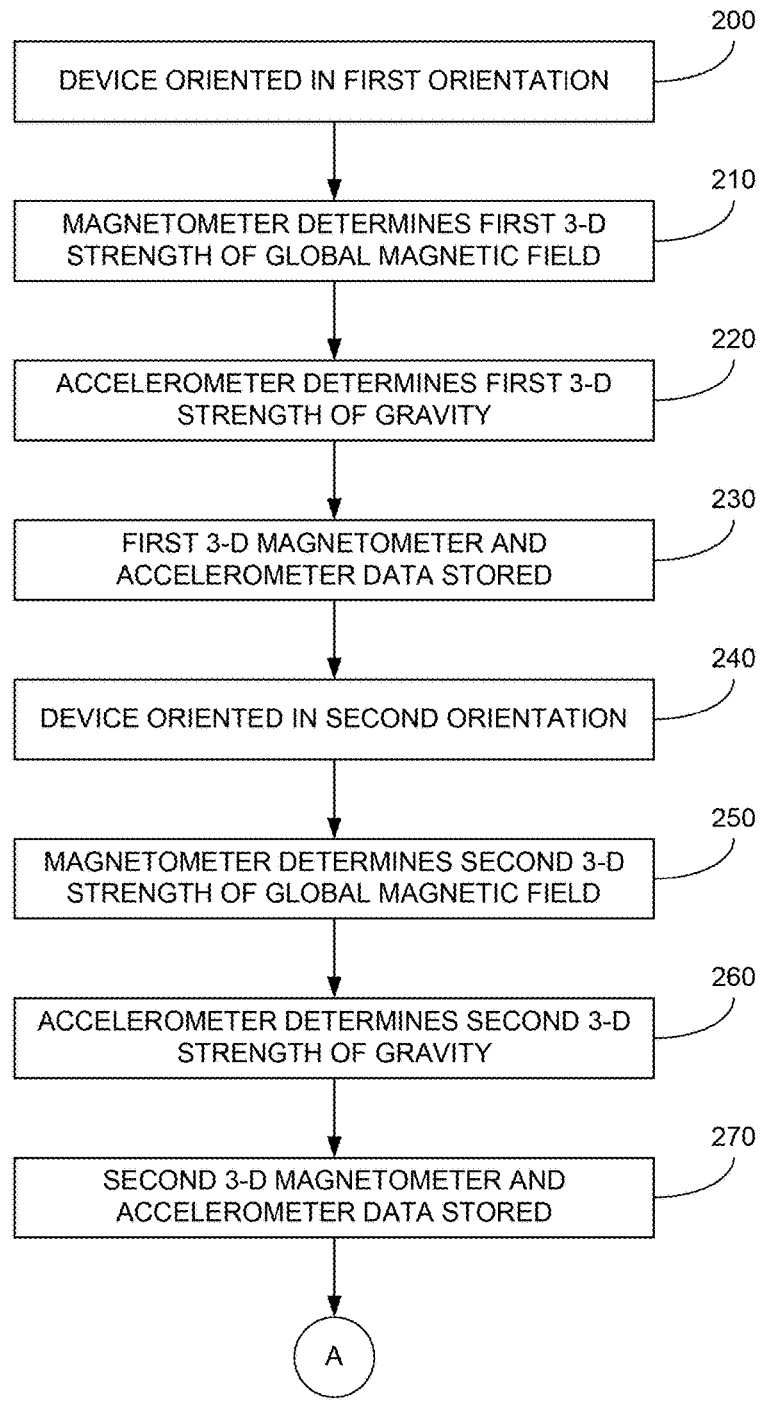
FIGS. 2A-B illustrate a block diagram of a method of operation of embodiments of the present invention.
Figure 2B:
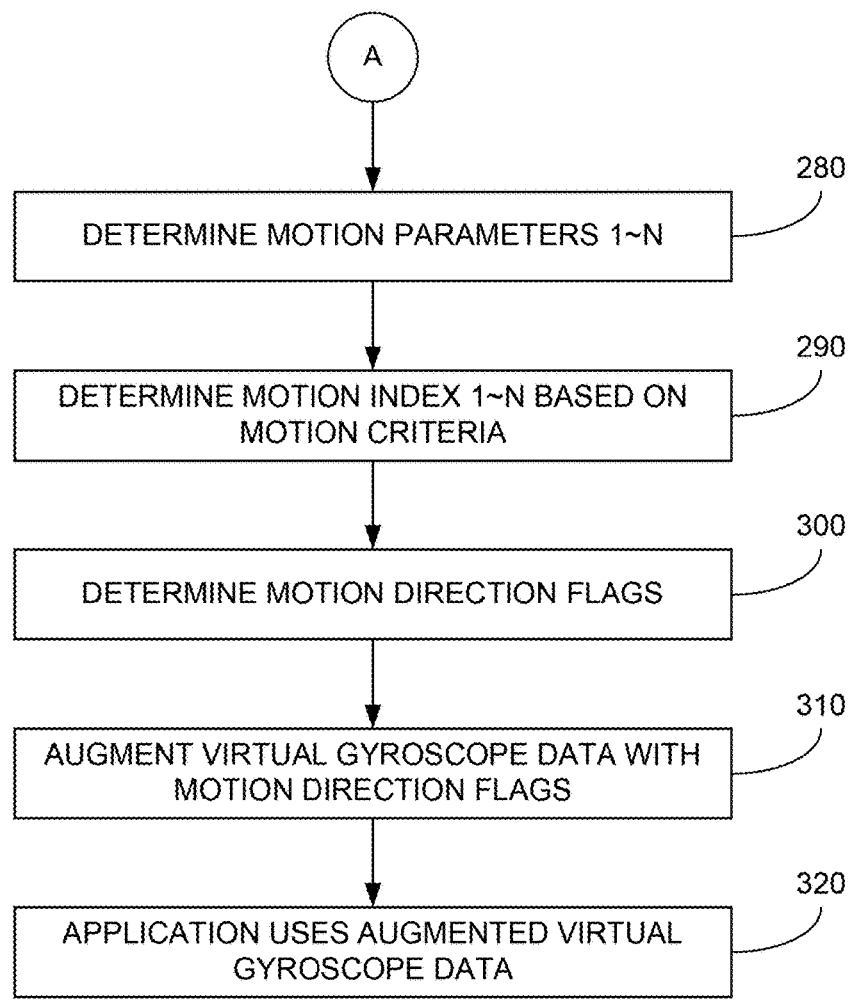

FIGS. 2A-B illustrate a block diagram of a method of operation of embodiments of the present invention. Initially, a device (e.g. handheld device, wearable device, etc.) is oriented in space in a first orientation or position, step 200. Next, a magnetometer determines the strength of the global magnetic field, in three-dimensions (of the device), step 210 and an accelerometer determines the strength of gravity in three-dimensions (of the device), step 220. These initial data readings are then stored in a local memory, step 230.

Subsequently, the device is oriented in space in a second orientation, step 240. This reorientation may be a result of a user holding the device in their hand and moving, or the like. Again, the magnetometer determines the three-dimensional strength of the global magnetic field, step 250, and the accelerometer determines the three-dimensional strength of gravity, step 260. These subsequent data readings are then stored in the local memory, step 270.

In various embodiments, a series of motion parameters 1-N are determined based upon the first and second accelerometer data and the first and second accelerometer data, step 280. Next, the series of motion parameters 1-N are processed relative to one or more criteria, to determine motion indices 1-N, step 290. These process are not merely a differencing between such data, but computation of novel parameters and indices, as will be described further below.

In various embodiments, based upon the series of motion indices 1-N, motion direction flags are determined, step 300. As will be discussed below, in one example, the motion direction flags may be combined with other data, such as virtual gyroscope data to determine augmented virtual gyroscope data, step 310. Next, the augmented virtual gyroscope data may be used as input data for one or more applications running upon the device, may be used to invoke one or more applications on the device, or the like, step 320. In some embodiments, the augmented virtual gyroscope data may be used for augmented reality programs, (indoor or outdoor), virtual reality programs, geographic navigation programs, entertainment programs, or the like. In other examples, the motion direction flags may be used by many other types of applications to provide directional information thereto. As discussed herein, in some embodiments, the motion direction flags may include panning in an x-direction and/or y-direction, movement in a z-direction, or the like.

Figure 3:
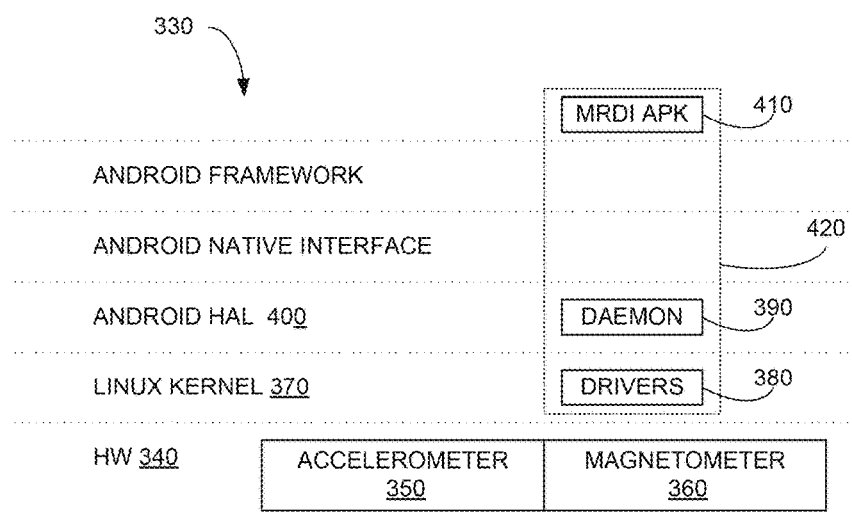
FIG. 3 illustrates a software structure according to some embodiments of the present invention.

FIG. 3 illustrates a software structure according to some embodiments of the present invention. More specifically, FIG. 3 illustrates an example of a software structure that is implemented upon an Android operating system device (e.g. smart device). It should be understood that alternative software structures would be used when implementing embodiments on other operating systems (e.g. iOS).

FIG. 3 illustrates a logical structure 330 according to one embodiment. As is illustrated, on the hardware level, 340, an accelerometer 350 and magnetometer 360 provide sensor data. In various embodiments, MEMS-based accelerometer and magnetometers are under development or available from the assignee of the present invention, or other commercially-available MEMS vendor. Above hardware level 340 is a Linux Kernel level 370 that includes one or more drivers 380 for sending and receiving sensor data from accelerometer 350 and magnetometer 360. In various embodiments, drivers 380 are provided by the manufacturer of the respective MEMS devices.

In the example in FIG. 3, one or more daemons 390 in a hardware abstraction layer 400, may be used to provide the accelerometer and magnetometer data to an android application package (APK), 410. In various embodiments, drivers 380, daemons 390 and APK 410 are provided as a software package 420 to enable the operations described above, in FIGS. 2A-B.

Figure 4:
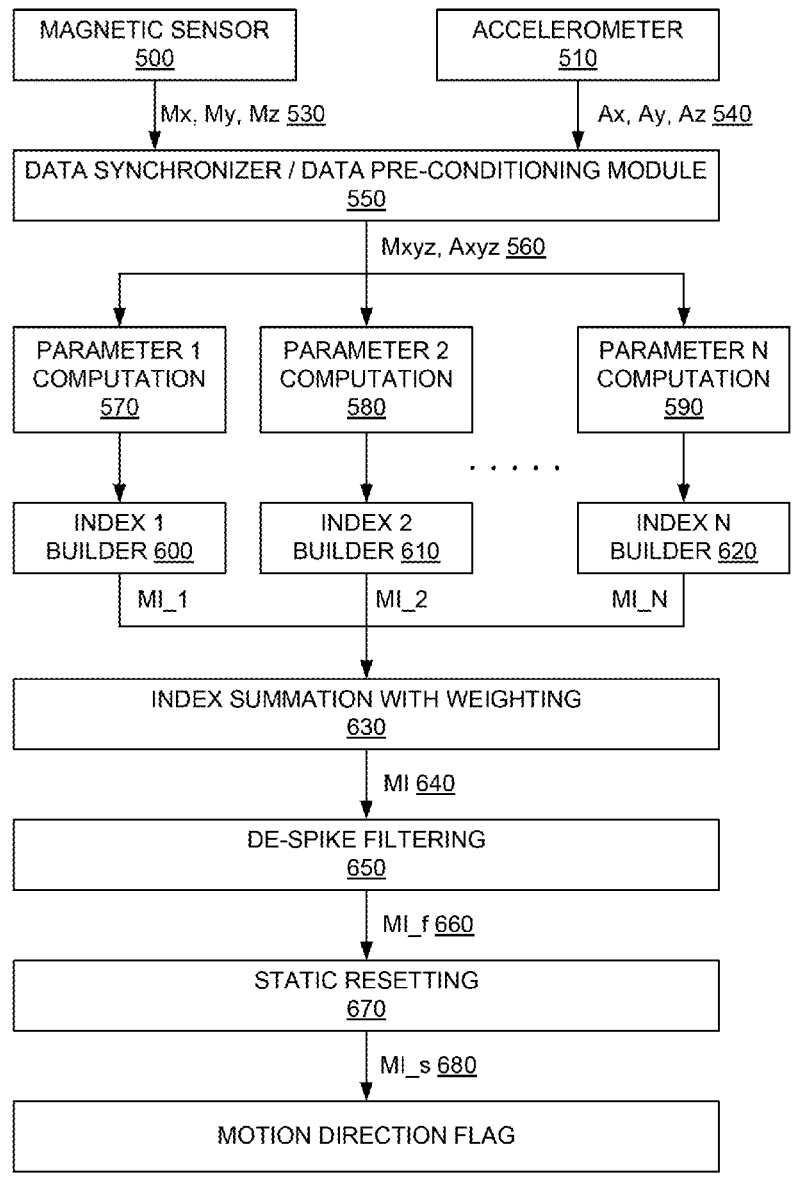
FIG. 4 illustrates a block diagram according to various embodiments of the present invention.

FIG. 4 illustrates a block diagram according to various embodiments of the present invention. More specifically, FIG. 4 provides further details regarding the process described in FIGS. 2A-B. In the process illustrated, a three-dimensional magnetic sensor 500 and a three-dimensional accelerometer 510 are provided.

As discussed above, magnetic sensor provides three-dimensional magnetic field readings (typically responsive to a global magnetic field) Mx, My, Mz 530; and accelerometer 510 provides three-dimensional accelerometer readings (typically responsive to a global gravity field) Ax, Ay, Az 540. In various embodiments, the magnetic field readings 530 and accelerometer readings 540 output may be associated with or have different time stamps. In other words, such data readings may be from different sampling times. Accordingly, in FIG. 4, a module 550 is provided.

In various embodiments, module 550 synchronizes accelerometer readings 540 and magnetic field readings 530. In the case where such data readings are from different times (e.g. associated with different time frames), module 550 may re-sample and may interpolate data readings from adjacent time frames. As a result of such processing, accelerometer readings 540 and magnetic field readings 530 associated with a first frame time; accelerometer readings 540 and magnetic field readings 530 associated with a second frame time; etc. can be determined. As will be described below, differences in such accelerometer readings 540 and magnetic field readings 540 over specific time intervals, (e.g. between the first frame time and the second frame; between the first frame time and a fifth frame time; or the like) time may be used to compute specific parameters over the specific time interval.

In various embodiments, module 550 is also used to pre-condition the data readings. For example, module 550 may perform noise-reduction techniques such as: band-pass filtering on the data readings, error analysis and recovery, outlier data rejection, and the like. In other embodiments, other types of pre-conditioning of the incoming data readings 530 and 540 may also be performed. As shown in FIG. 4, the synchronized and processed data readings 560 are then output to a number of parameter computation modules 570, 580 and 590.

In various embodiments, parameter computation modules 570-590 performs various unique computations based upon processed data readings 560, as disclosed below. In the following example, processed data readings 560 may be referred to as ($\vec{M}^k, \vec{A}^k$); where k represents data occurring in the k·Δt (k-th sampling interval). In some embodiments, parameter computation modules may be:

i. Para-1: ($|A_x^k|$, $|A_y^k|$, $|A_z^k|$) the absolute values of acceleration in each axis ii. Para-2: pseudo velocity integrated from acceleration $$\begin{cases} V_x^k = V_x^{k-1} + A_x^k \Delta t \\ V_y^k = V_y^{k-1} + A_y^k \Delta t \\ V_z^k = V_z^{k-1} + A_z^k \Delta t \end{cases}$$

iii. Para-3: rate of change of magnetic field for a given length of time interval (N=5~15, depending on the device characteristics)

$$\begin{cases} RM_x^k = \frac{|M_x^k - M_x^{k-N}|}{N \cdot \Delta t} \\ RM_y^k = \frac{|M_y^k - M_y^{k-N}|}{N \cdot \Delta t} \\ RM_z^k = \frac{|M_z^k - M_z^{k-N}|}{N \cdot \Delta t} \end{cases}$$

In various embodiments, other computed parameters may be determined and used in addition to those described above, or instead of those described above. For example, different number of time intervals may be used, e.g. between a first and second frame time; between a first and tenth frame time; or the like.

The computed parameters are then input in index modules 600-620, and the computed parameters are compared to one or more thresholds or criterion for the respective parameters. In some embodiments, outputs of index modules 600-620 may be step-like, e.g. +1 or −1; +1 or 0; or the like. The thresholds used for comparison may be pre-determined based upon empirically derived computed parameters, based upon theoretical computed parameters, or the like. In some examples, the motion index thresholds are determined with the criteria defined according to the empirical distribution statistics of each computed motion parameter for each motion type desired, e.g. X-panning and Y-panning. In various embodiments, empirical distribution statistics may be determined during fabrication time, development time, or the like, based upon one or more calibration operation.

Figure 5A:
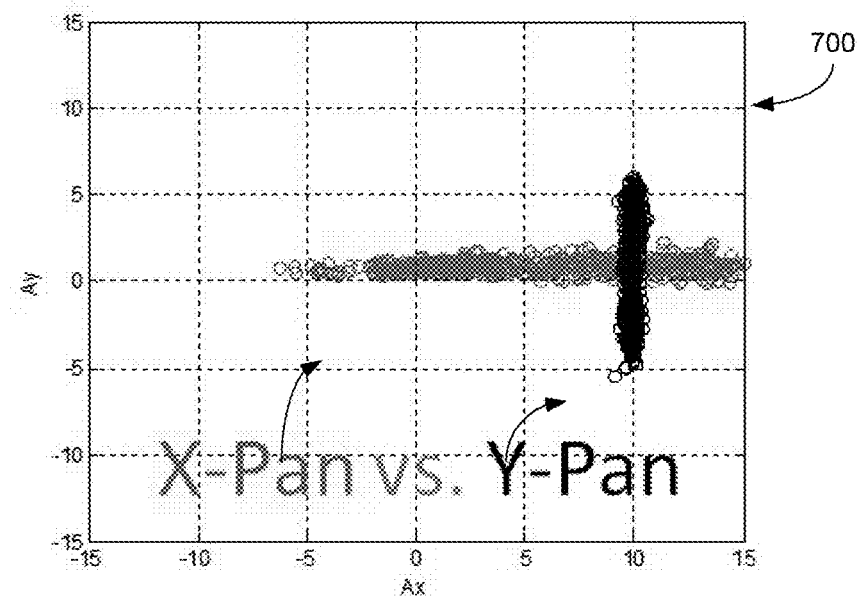
FIGS. 5A-B illustrates empirical data according to various embodiments of the present invention.
Figure 5B:
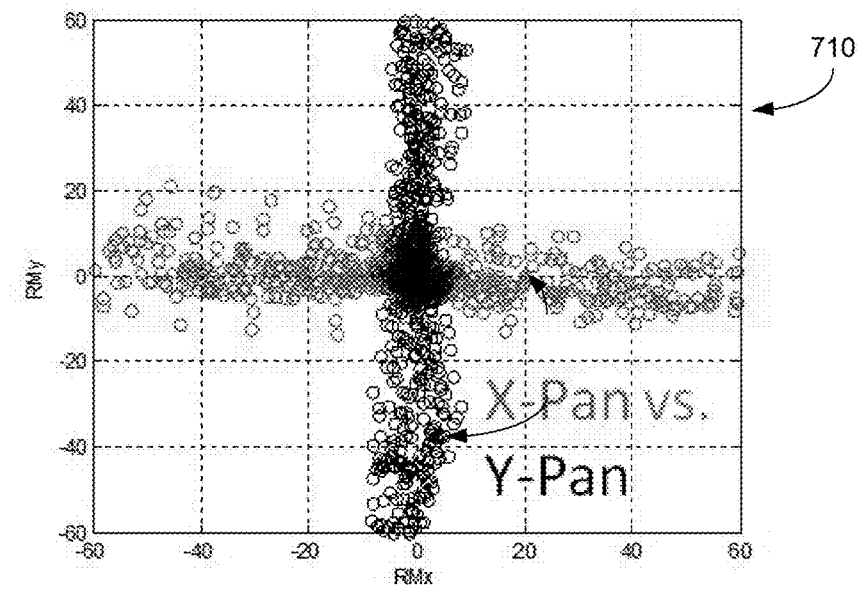

FIGS. 5A-B illustrates empirical data according to various embodiments of the present invention. In particular, graph 700 illustrates a two-dimensional phase diagrams that include accelerometer distribution statistics based upon experimental data, and graph 710 illustrates a two-dimensional phase diagrams that include magnetometer distribution statistics based upon experimental data. In various embodiments, the experimental data for the magnetometer and the accelerometer may be captured at the same time, or in separate trials.

In graph 700, as can be seen during X-axis panning, Ax movement (x-direction acceleration) is primarily determined; and during Y-axis panning, Ay (y-direction acceleration) movement is primarily determined. In graph 710, as can be seen during X-axis panning, Mx movement (x-direction motion) is primarily determined; and during Y-axis panning, My (y-direction direction) movement is primarily determined. Based upon this empirical data, parameters can be determined that can highlight or emphasize the specific motion direction, based upon the processed accelerometer and magnetometer data. The empirical data may also be used for the weighting and computations performed below.

In various embodiments, the outputs of index modules 600-620 are input into a summation module 630. More specifically, the inputs are weighted and summed according to the following:

$$MI^k = \beta_1 \cdot MI_1^k + \beta_2 \cdot MI_2^k + \beta_3 \cdot MI_3^k$$

where ($MI_1^k, MI_2^k, MI_3^k$) represents the each motion index at time k·Δt, where MI represents a summation, and where weighting factors ($\beta_1, \beta_2, \beta_3$) are used.

In various embodiments, the weighting factors are determined and tuned through empirical device testing, for the given motion to be detected, e.g. panning. In other embodiments, the weighting factors may vary for different devices. As discussed above, empirical testing may be done at development time, fabrication time, or the like.

Subsequently, the summation MI, 630 is input into a filter module 650. In various embodiments, band-pass filtering, de-spike filtering (e.g. outlier filtering), low-pass filtering, or the like may be performed upon MI, to smooth-out unexpected spike signals. Various algorithms may be used, such as moving-average filters, FFT, and the like. For example, in one embodiment, the following is computed:

$$MI_f^k = \frac{1}{N} \sum_{j=k-N+1}^{k} MI^k = MI_f^k.$$

An output of filter module 650 is a filtered time series of summations, MI_f 660.

In various embodiments, a static-reset module 670 is provided that provides feedback to filtering module 650. In particular, static-reset module 670 determines whether the computed MI_f 660 is associated with a static condition, or not. In various embodiments, MI_F 660 is reset (or set to zero) when static-reset module 670 determines a static condition (i.e. the device is not moving.) In one example a reset algorithm may be similar to the following:

$$\begin{cases} \text{if "static" detected, } MI_f^k = 0, k = k - N + 1 \sim k \\ \text{if "static" not detected, } MI_f^k \text{ remains its value} \end{cases}$$

In FIG. 4, an output MI_s 680 is output from static-reset module 670 and represents a time series of motion direction values or flags, is illustrated in the figures, below.

Figure 6A:
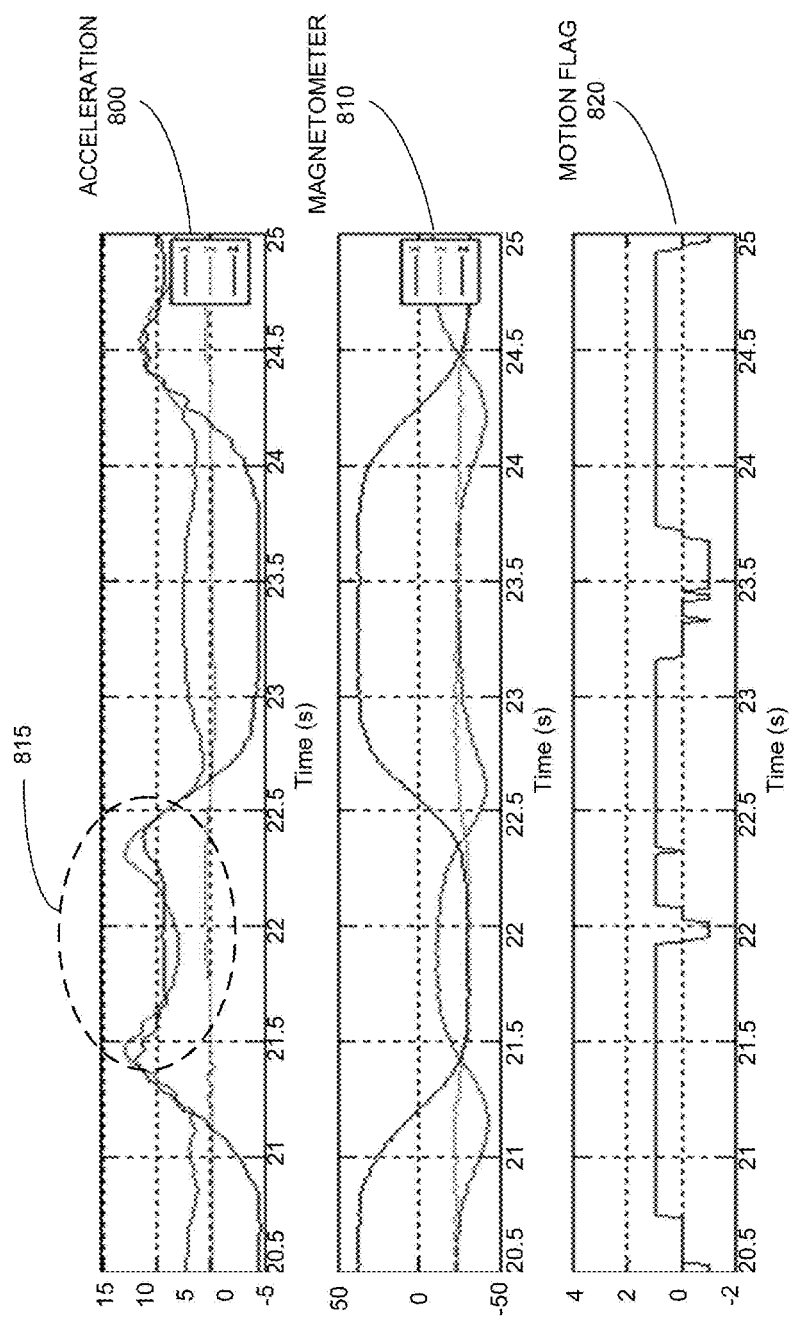
FIGS. 6A-B illustrate example of data captured and computed by embodiments of the present invention.
Figure 6B:
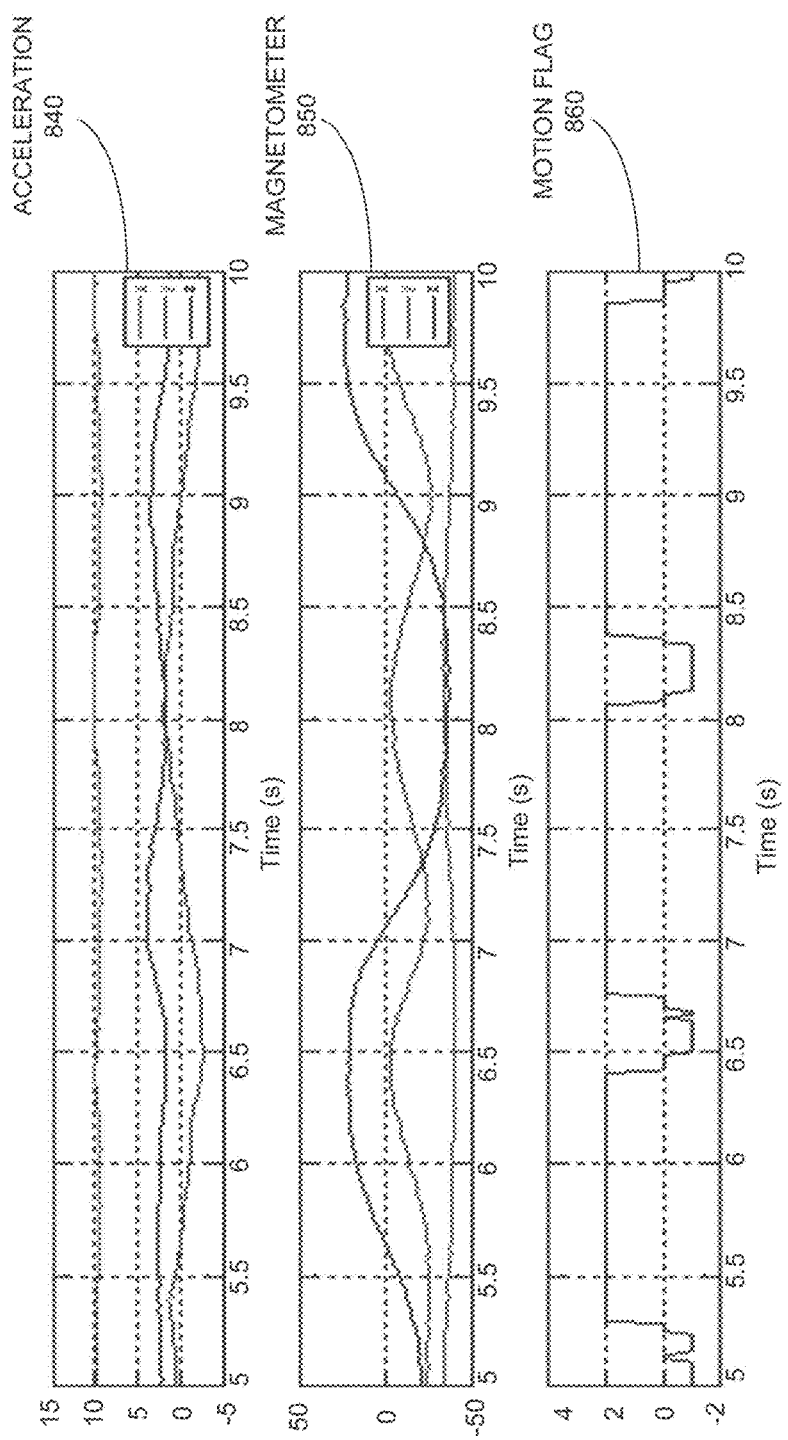

FIGS. 6A-B illustrate example of data captured and computed by embodiments of the present invention. In particular, graph 800 illustrates accelerometer data in three-dimensions with respect to time; graph 810 illustrates magnetometer data in three-dimensions with respect to time; and graph 820 illustrates a motion flag graph. In the particular example, motion flag graph 820 indicates "1" when an x-axis movement is determined, a "0" when there is slow x-axis movement is determined, and a "−1" when a ultra-slow x-axis movement is determined. In other embodiments, other sets of values for motion flow graph may be used. Further, other sets of values may represent other types of movements. As can be seen in FIG. 6A, as moving speed is above a pre-determined threshold, e.g. within region 815, the motion flag will be real-time generated correctly in response to the actual panning motion.

Additionally, graph 840 illustrates accelerometer data in three-dimensions with respect to time; graph 850 illustrates magnetometer data in three-dimensions with respect to time; and graph 860 illustrates a motion flag graph. In the particular example, motion flag graph 860 "1" when an y-axis movement is determined, a "0" when there is slow y-axis movement is determined, and a "−1" when a ultra-slow y-axis movement is determined. Again, in other embodiments, values for motion flow graph may represent other types of movements. As can be seen in FIG. 6B, as moving speed is above a pre-determined threshold, the motion flag will be real-time generated correctly in response to the actual panning direction.

Figure 7:
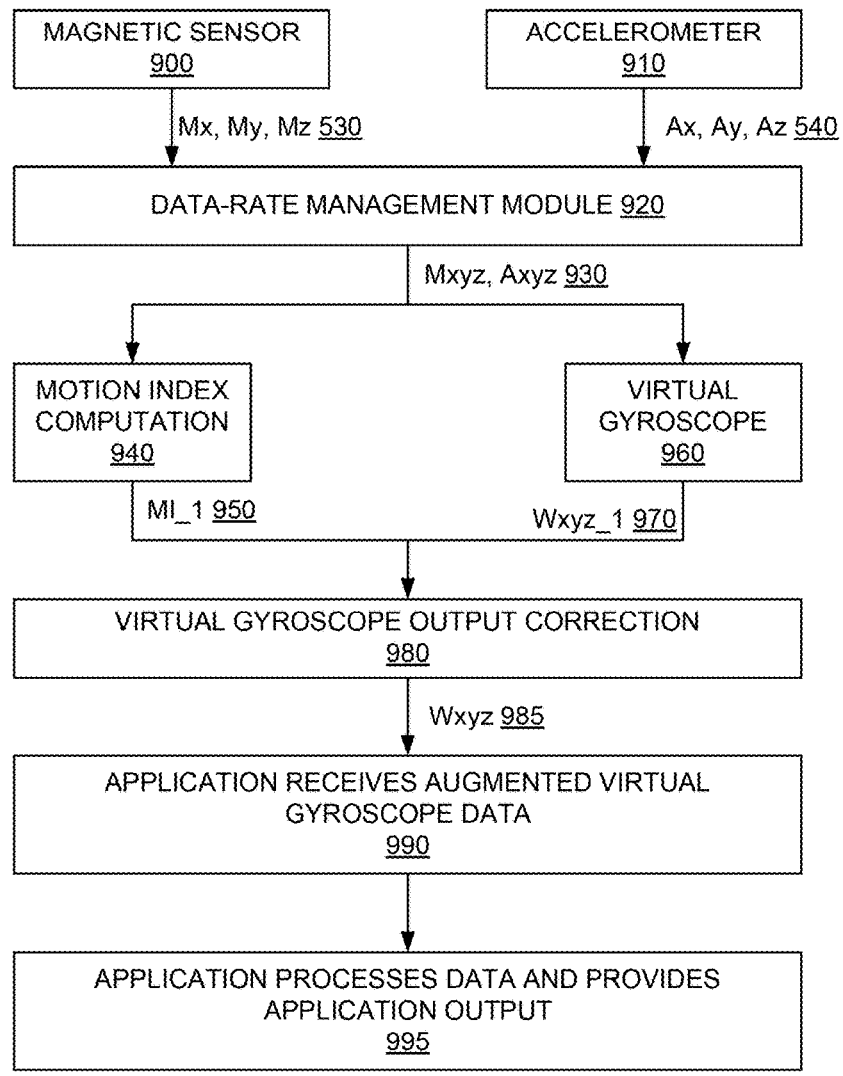
FIG. 7 illustrates another embodiment of the present invention.

FIG. 7 illustrates another embodiment of the present invention. As illustrated, a magnetometer 900 and an accelerometer 910 provide magnetometer and accelerometer data to a data-rate management module 920. As described above, data-rate management module 920 performs functionality similar to data sync module 550, such as aligning the magnetometer and accelerometer in time, and the like. In this example, the processed data 930 is provided to motion index module 940. As described above, motion index module 940 can determine a number parameters, a number of motion indexes, a weighting of the motion indexes, and the like, for specific time intervals, as was described in FIG. 4 above. An output 950 of module 940 may be one or more motion index determination, as illustrated in FIG. 5, above.

As illustrated in FIG. 7, the processed data 930 may also be input into a virtual gyroscope processing module 960. In various embodiments, virtual gyroscope processing module 960 may include various virtual gyroscope algorithms that determine angular velocities in three-axes based upon accelerometer and/or magnetometer data. Output 970 from module 960 represents the angular velocities.

In various implementations, virtual gyroscopes often encounter a cross-axis problem in output data, which causes a "trace distortion" for 3-D applications, such as 3-D virtual-reality programs or games. For example, as a user rotates a device from one direction (e.g. left to right or up to down), a real gyroscope will output data primarily in one axis, however a virtual gyroscope algorithm will typically output rotation data artifacts in multiple axis.

Accordingly, in various embodiments, output 950 and output 970 are combined within module 980 to determine revised rotation data 980 of the module. In particular, output 950 may be used to augment or update the virtual gyro data, output 970. For example, output 950 may be used to specify which data axis is selected (also which axis to ignore) for output 980 based upon the virtual gyroscope data output 970.

The revised rotation data 985 can then be input to one or more applications 990 running upon the device. In one example, the revised rotation data 985 may be used to update a display of stars in an augmented reality program, a planetarium application program, an interior positioning or navigation program, an image capture or stitching program, or the like, 995.

Various embodiments of the above may be used to replace a physical gyroscope in a hand-held device, thereby reducing power consumption. For example, a physical gyroscope is known to consume about 1 to 1.5 mA during operation, whereas a typical accelerometer/magnetometer combination would consume about 0.2 to about 0.25 mA. Accordingly, a hand held device according to various embodiments will not only cost a manufacturer less to manufacture, but will have lower power consumption.

Figure 8:
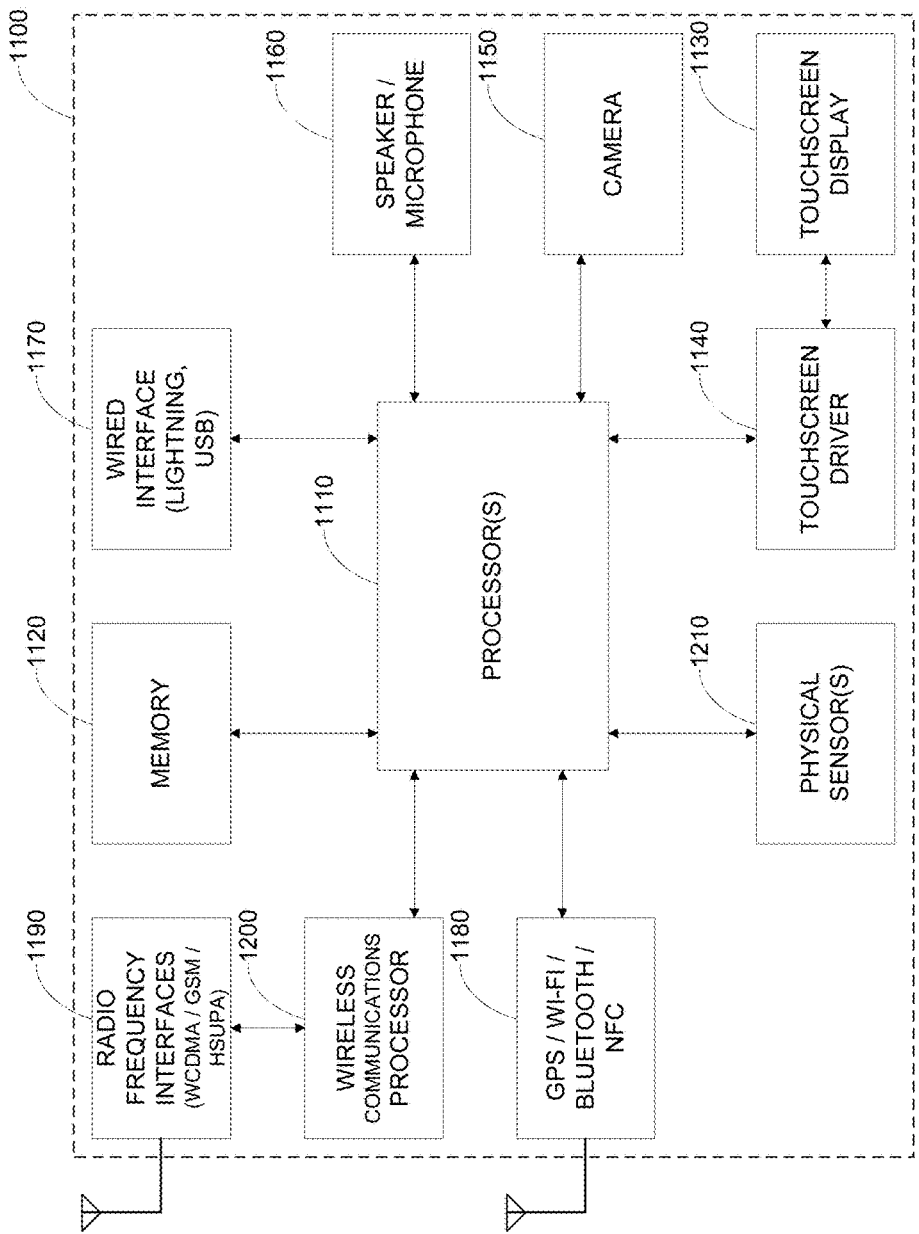
FIG. 8 illustrates a functional block diagram of various embodiments of the present invention.

FIG. 8 illustrates a functional block diagram of various embodiments of the present invention. In FIG. 8, a computing device 1100 typically includes an applications processor 1110, memory 1120, a touch screen display 1130 and driver 1140, an image acquisition device 1150, audio input/output devices 1160, and the like. Additional communications from and to computing device are typically provided by via a wired interface 1170, a GPS/Wi-Fi/Bluetooth interface 1180, RF interfaces 1190 and driver 1200, and the like. Also included in various embodiments are physical sensors 1210.

In various embodiments, computing device 1100 may be a hand-held computing device (e.g. Apple iPad, Amazon Fire, Microsoft Surface, Samsung Galaxy Tab series, an Android Tablet); a smart phone (e.g. Apple iPhone, Motorola Moto series, Google Nexus, HTC, Samsung Galaxy S); a portable computer (e.g. netbook, laptop, ultrabook), a media player (e.g. Apple iPod); a reading device (e.g. Amazon Kindle, Barnes and Noble Nook); a fitness tracker (e.g. from Fitbit, Apple Watch, Garmin, or the like); a headset (e.g. Oculus Rift, HTC Vive, Sony PlaystationVR); or the like.

Typically, computing device 1100 may include one or more processors 1110. Such processors 1110 may also be termed application processors, and may include a processor core, a video/graphics core, and other cores. Processors 1110 may be a processor from Apple (e.g. A9), NVidia (e.g. Tegra), Intel (Core), Marvell (Armada), Qualcomm (Snapdragon), Samsung (Exynos), TI, NXP, or the like. In various embodiments, the processor core may be an Intel processor, an ARM Holdings processor such as the Cortex or ARM series processors, or the like. Further, in various embodiments, the video/graphics core may be an AMD graphics processor (e.g. Radeon), Imagination Technologies processor PowerVR graphics, an Nvidia graphics processor (e.g. GeForce), integrated graphics (e.g. Intel) or the like. Other processing capability may include audio processors, interface controllers, and the like. It is contemplated that other existing and/or later-developed processors may be used in various embodiments of the present invention.

In various embodiments, memory 1120 may include different types of memory (including memory controllers), such as flash memory (e.g. NOR, NAND), pseudo SRAM, DDR SDRAM, or the like. Memory 1120 may be fixed within computing device 1100 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 1130 and driver 1140 may be based upon a variety of later-developed or current touch screen technology including resistive displays, capacitive displays, optical sensor displays, electromagnetic resonance, or the like. Additionally, touch screen display 1130 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 1150 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 1160 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 1110 to enable the user to operate computing device 1100 by stating voice commands. Additionally, a speech engine may be provided in various embodiments to enable computing device 1100 to provide audio status messages, audio response messages, or the like.

In various embodiments, wired interface 1170 may be used to provide data transfers between computing device 1100 and an external source, such as a computer, a remote server, a storage network, another computing device 1100, or the like. Such data may include application data, operating system data, firmware, or the like. Embodiments may include any later-developed or conventional physical interface/protocol, such as: USB, micro USB, mini USB, Firewire, Apple Lightning connector, Ethernet, POTS, or the like. Additionally, software that enables communications over such networks is typically provided.

In various embodiments, a wireless interface 1180 may also be provided to provide wireless data transfers between computing device 1100 and external sources, such as computers, storage networks, headphones, microphones, cameras, or the like. As illustrated in FIG. 8, wireless protocols may include Wi-Fi (e.g. IEEE 802.11 a/b/g/n, WiMax), Bluetooth, IR, near field communication (NFC), ZigBee and the like.

GPS receiving capability may also be included in various embodiments of the present invention, however is not required. As illustrated in FIG. 8, GPS functionality is included as part of wireless interface 1180 merely for sake of convenience, although in implementation, such functionality is currently performed by circuitry that is distinct from the Wi-Fi circuitry and distinct from the Bluetooth circuitry.

Additional wireless communications may be provided via RF interfaces 1190 and drivers 1200 in various embodiments. In various embodiments, RF interfaces 1190 may support any future-developed or conventional radio frequency communications protocol, such as CDMA-based protocols (e.g. WCDMA), GSM-based protocols, HSUPA-based protocols, or the like. In the embodiments illustrated, driver 1200 is illustrated as being distinct from applications processor 1110. However, in some embodiments, these functionality are provided upon a single IC package, for example the Marvel PXA330 processor, and the like. It is contemplated that some embodiments of computing device 1100 need not include the RF functionality provided by RF interface 1190 and driver 1200.

FIG. 8 also illustrates computing device 1100 to include physical sensors 1210. In various embodiments of the present invention, physical sensors 1210 are multi-axis Micro-Electro-Mechanical Systems (MEMS) based devices being developed by mCube, the assignee of the present patent application. Physical sensors 1210 developed by mCube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 1100 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 1210 are manufactured using a foundry-compatible process. As explained in such applications, because the process for manufacturing such physical sensors can be performed on a standard CMOS fabrication facility, it is expected that there will be a broader adoption of such components into computing device 1100. In other embodiments of the present invention, conventional physical sensors 1210 from Bosch, STMicroelectronics, Analog Devices, Kionix, Invensense, or the like may be used.

In various embodiments, any number of future developed or current operating systems may be supported, such as iPhone OS (e.g. iOS), Windows, Google Android, or the like. In various embodiments of the present invention, the operating system may be a multi-threaded multi-tasking operating system. Accordingly, inputs and/or outputs from and to touch screen display 1130 and driver 1140 and inputs/or outputs to physical sensors 1210 may be processed in parallel processing threads. In other embodiments, such events or outputs may be processed serially, or the like. Inputs and outputs from other functional blocks may also be processed in parallel or serially, in other embodiments of the present invention, such as image acquisition device 1150 and physical sensors 1210.

FIG. 8 is representative of one computing device 1100 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 8. For example, in various embodiments, computing device 1100 may lack image acquisition unit 1150, or RF interface 1190 and/or driver 1200, or GPS capability, or the like. Additional functions may also be added to various embodiments of computing device 1100, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method for a portable computing device comprising:
   determining in a magnetometer in the portable computing device, a plurality of magnetic data in response to a physical perturbation of the portable computing device;
   determining in an accelerometer in the portable computing device, a plurality of acceleration data in response to the physical perturbation of the portable computing device;
   determining with a processor in the portable computing device, a plurality of computed parameters in response to the plurality of magnetic data and the plurality of acceleration data, wherein the plurality of computed parameters includes a first computed parameter and a second computed parameter;
   determining with the processor, an initial motion direction indicator in response to a weighted combination of the first computed parameter and the second computed parameter;
   filtering with the processor, the initial motion direction indicator to form a motion direction indicator, wherein the filtering is selected from a group consisting of: a de-spike filter, a low-pass filter, and a band-pass filter;
   determining with the processor, a function to perform in response to the motion direction indicator; and
   displaying on a display of the portable computing device with the processor, a graphic image in response to the function.

2. The method of claim 1
   wherein the plurality of magnetic data is a function of time;
   wherein the plurality of acceleration data is a function of time; and
   wherein the method further comprising before the determining the plurality of computed parameters, synchronizing the plurality of magnetic data and the plurality of acceleration data.

3. The method of claim 1 wherein the determining with the processor, the initial motion direction comprises:
   weighting with the processor, the first computed data with a first plurality of weights to form weighted first computed data;
   weighting with the processor, the second computed data with a second plurality of weights to form weighted second computed data; and
   performing with the processor, a summation of the weighted first computed data and the weighted second computed data.

4. The method of claim 1 wherein the function comprises determining the graphic image.

5. The method of claim 1 wherein the function comprises updating a map displayed on the display.

6. The method of claim 4 wherein the graphic image comprises a heading indicator.

7. The method of claim 1 further comprising:
   determining with a gyroscope, in the portable computing device, a plurality of gyroscope data in response to a physical perturbation of the portable computing device; and
   wherein the function comprises combining the plurality of gyroscope data and the motion direction indicator.

8. The method of claim 7 wherein the graphic image comprises an indicator selected from a group consisting of: a pan indicator and a tilt indicator.

9. A portable computing device comprising:
   a magnetometer for determining a plurality of magnetic data in response to a physical perturbation of the portable computing device;
   an accelerometer for determining a plurality of acceleration data in response to the physical perturbation of the portable computing device;
   a processor coupled to the magnetometer and the accelerometer for determining a plurality of computed parameters in response to the plurality of magnetic data and the plurality of acceleration data, wherein the plurality of computed parameters includes a first computed parameter and a second computed parameter, wherein the processor is for determining an initial motion direction indicator in response to a weighted combination of the first computed parameter and the second computed parameter, wherein the processor is for filtering the initial motion direction indicator to form a motion direction indicator using a function selected from a group consisting of: a de-spike filter, a low-pass filter, and a band-pass filter, wherein the processor is for determining a function to perform in response to the motion direction indicator, and wherein the processor is for determining a graphic image in response to the function; and
   a display coupled to the processor for displaying the graphic image.

10. The device of claim 9
    wherein the plurality of magnetic data is a function of time;
    wherein the plurality of acceleration data is a function of time; and
    wherein the process is configured synchronizing the plurality of magnetic data and the plurality of acceleration data prior to determining the plurality of computed parameters.

11. The device of claim 9
    wherein the processor is configured to weigh the first computed data with a first plurality of weights to form weighted first computed data;
    wherein the processor is configured to weigh the second computed data with a second plurality of weights to form weighted second computed data; and
    wherein the processor is configured to perform a summation of the weighted first computed data and the weighted second computed data.

12. The device of claim 9 wherein processor is configured to determine the graphic image.

13. The device of claim 9 wherein the processor is configured to update a map displayed on the display.

14. The device of claim 13 wherein the processor is configured to update a heading indicator on the map.

15. The device of claim 9 further comprising:
    a gyroscope configured to provide a plurality of gyroscope data in response to the physical perturbation of the portable computing device; and
    wherein the processor is configured to combine the plurality of gyroscope data and the motion direction indicator to determine improved gyroscope data.

16. The device of claim 15 wherein the graphic image comprises an indicator selected from a group consisting of: a pan indicator and a tilt indicator.

* * * * *